July 2, 1968 R. W. HEVEY 3,391,313
CAPACITOR AND METHOD OF MAKING THE SAME
Filed Jan. 31, 1967 2 Sheets-Sheet 1
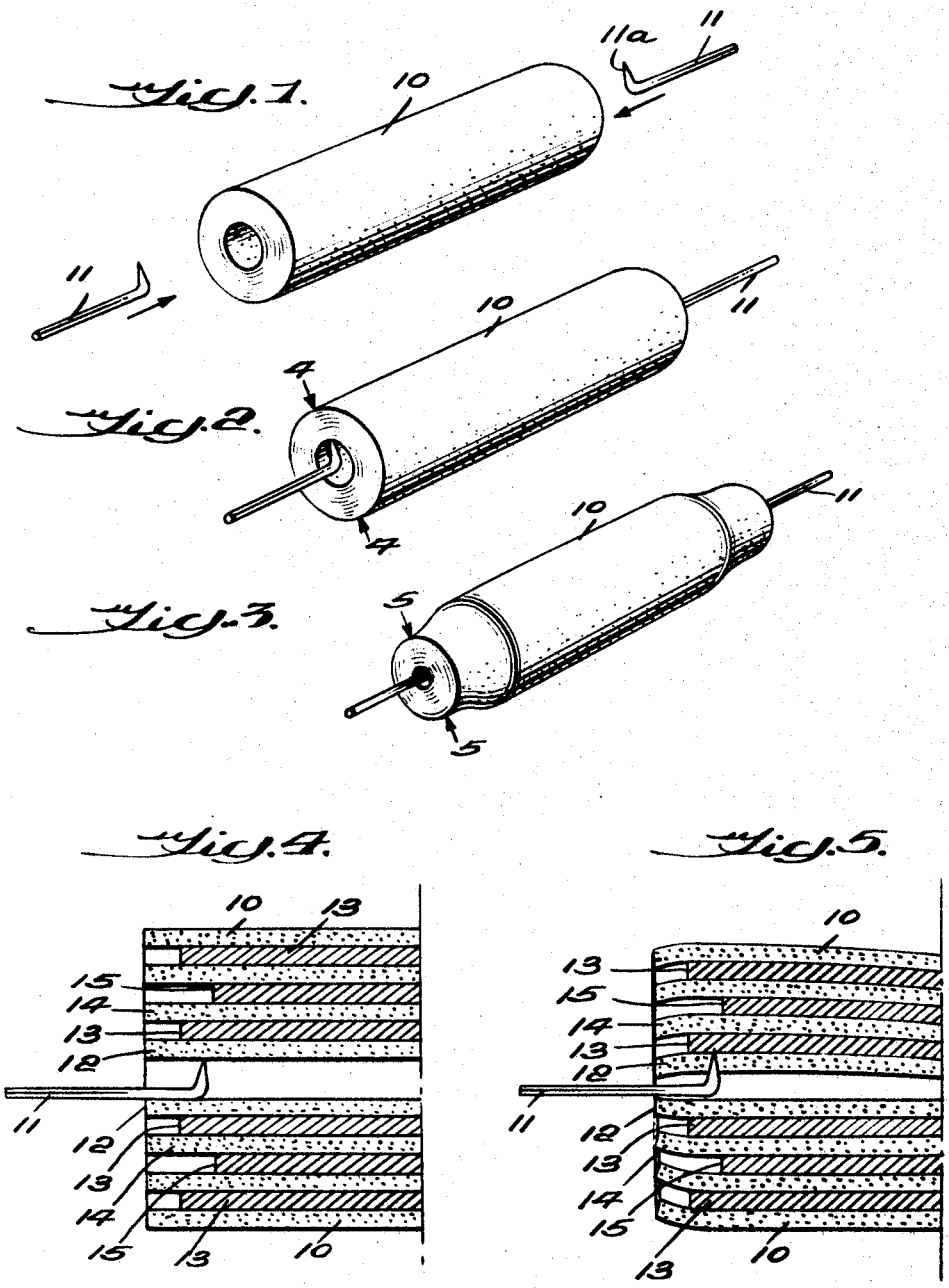

3,391,313
CAPACITOR AND METHOD OF MAKING
THE SAME
Ronald W. Hevey, Wilmington, Del., assignor to E. I. du
Pont de Nemours and Company, Wilmington, Del., a
corporation of Delaware
Filed Jan. 31, 1967, Ser. No. 612,912
8 Claims. (Cl. 317—258)

ABSTRACT OF THE DISCLOSURE

Capacitors having barbed terminals applied by shrinking dielectric thereon so that the barbs penetrate to and make electrical contact with the capacitor electrodes.

Background of the invention

Figure 6A:
Figure 6B:
Figure 6C:
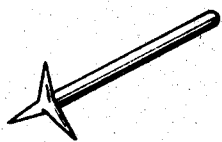
Figure 6D:
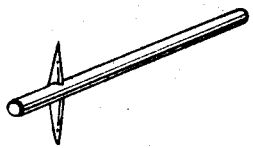
Figure 6E:
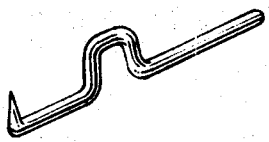

The manufacture of small rolled capacitors in large numbers as a relatively inexpensive article of commerce has resulted from mechanization and automation of the process of their preparation. The winding of dielectric webs and electrodes to make a capacitor preform is carried out on semi-automatic or automatic machinery. In the application of terminal leads to the electrodes hand operations may be required, or operations may be carried out which may be deleterious to the structure. The terminals must make electrical contact with the electrodes and must be sufficiently strong to withstand mechanical handling necessary for incorporation in circuits.

Various methods of attaching leads are known. In one method, foils are provided and extend beyond the edge of the dielectric. With aluminum foil electrodes, special solders may be needed to attach the lead wire, and the capacitor may require encapsulation to avoid shorting of the exposed electrodes. In another structure, the electrode is within, or coextensive with, the dielectric. For such structure, tabs of metal can be inserted during the capacitor preform winding, but this is awkward and complicates the winding process. Terminals may be inserted by heating the lead wire to a sufficient temperature to melt the dielectric and pressing in the ends of the capacitor preform. However, such melting usually degrades the electrical properties of the dielectric. In another practice where the electrodes are coextensive with the dielectric, metal may be sprayed on the ends of the preform by the Schlopp process and the leads soldered in place as noted for the extended foil electrodes. These are added steps, and therefore expensive, and care must be taken to mask the ends of the preform and to avoid overheating of the preform. Leads attached in this manner are not mechanically, strongly attached and may pull out.

Typical prior art in this field includes the following United States patents: 3,221,227, 3,071,842, 3,094,651, 2,735,970, 3,243,675, and 3,100,857. Other art includes British Patent No. 715,674 and Canadian Patent No. 717,675

Summary of the invention

In the present invention rolled electric capacitors are provided having terminals, or leads, extending from each end. These leads are anchored to the electrodes by a barb or pointed end that is at about a right angle to the lead. This barb is integral with the terminal, or lead, and extends through at least one layer of dielectric and into contact with an electrode. The structure is produced by inserting barbed leads in a hollow core preform of an offset electrode rolled electric capacitor with the barbs positioned at the electrode offset, and the preform is then heated to shrink the dielectric of the preform and cause the barbs to penetrate the preform and engage the capacitor electrodes. The invention thus provides a very simple method of attaching terminals to this type capacitor and results in surprisingly strong connections.

Reference will now be made to the drawing in which
FIGURE 1 is a perspective view of a capacitor preform showing barbed terminals spaced from its ends;
FIGURE 2 is a similar view of the preform of FIGURE 1 with the terminals inserted in the hollow core;
FIGURE 3 is a view of the product resulting upon subjecting that of FIGURE 2 to shrinking;
FIGURES 4 and 5 are partial sections along lines 4—4 and 5—5 of FIGURES 2 and 3 respectively; and
FIGURE 6 shows seven forms of terminals that can be employed in this invention.

Referring to the drawing, in FIGURE 1 a convolutely wound, offset electrode, hollow core capacitor preform 10 is shown ready for the insertion of two barbed terminal leads 11. Such preforms are well known in the art and can be made by any desired process for purposes of this invention. The terminals 11 are inserted in the ends of capacitor core to a depth such that the barbed ends 11a are opposite the offset portion of the electrode at that end. The assembly then is subjected to a heat treatment to shrink the dielectric. During shrinkage, the terminal barb 11a, which is sharp, penetrates one or more of the dielectric 12 and electrode 13 layers. Consequently the terminals 11 are locked in place mechanically by the shrinkage of the dielectric about the lead and especially by the penetration of the barbs 11a into the wound layers. The barb 11a, in penetrating the preform 10, makes electrical contact with the electrode 13. FIGURE 3 shows the capacitor after shrinkage, with the leads attached.

As noted wound capacitors of this invention have offset electrodes. This is shown in FIGURES 4 and 5. The capacitor preform of FIGURE 2 was wound from four webs. While four individual webs are shown, it should be understood that laminates of metal and dielectric, prepared by metallizing a dielectric or by other methods, could as well be used. Webs 12 and 14 are dielectric spacer films such as shrinkable oriented polyester such as poly(ethylene terephthalate), polyvinylhalocarbon such as polytetrafluoroethylene, or polyhydrocarbon such as polypropylene. Web 12 and web 14 may be of the same or different compositions and each of the webs may be formed of a plurality of layers of dielectric. The electrode webs 13 and 15 are generally of conductive metal such as aluminum or lead tin foils from 0.1 to 1 mil thick. Aluminum foils about one-quarter mil thick are particularly satisfactory in electrical characteristics, cost and handling characteristics during winding. As shown in FIGURES 4 and 5, foil 15 is offset from foil 13 and is further from the edge of the dielectric so that when the terminal contact is made with foil 13, a short will not occur between the two foils if the barb penetrates as deep as foil 15. At the opposite end (not shown) the foil 15 is closer to the edge of the dielectric than foil 13 for similar reasons in attaching the second terminal.

The shrinkage operation causes collapse of the hollow core on the terminal and forces the barb 11a into the preform 10. FIGURE 5 shows the arrangement after shrinkage. The barb 11a on terminal 11 has penetrated through dielectric 12 and foil electrode 13 and is an electrical contact with electrode 13. It should be understood that FIGURES 4 and 5 are somewhat exaggerated to better show some of the essential details. A typical roll capacitor can have from ten to fifty or more wraps of the four webs depending upon the desired capacitance of the finished unit. Further, the barb 11a normally penetrates several dielectric layers and makes several contacts with electrode web 13. Although one electrode can be coextensive with dielectric webs 12 and 14 at each end of the structure, in the preferred embodiments the dielectric webs extend beyond the electrodes and seal the ends of the capacitor upon shrinkage.

Shrinkage can be brought about in any desired manner. Heating in a circulating air oven is satisfactory. The temperature needed obviously is dependent on the dielectric employed and the capacitor physical characteristics and can be readily determined by any artistan. The shrinking that occurs is, as is known, essentially a relaxation of the orientation imparted in stretching organic orientable dielectric materials.

For purposes of the present invention, shrinkable dielectric is necessary. Such dielectric can shrink in one direction or biaxially. If the shrinkage occurs in one dimension, it is preferred that this be along the direction of winding of the convolutions of the capacitor. The degree of shrinkage required will depend upon core size, outside dimensions of the capacitor perform, the tightness of wrap, and the shape of the barbed terminal. In general, the dielectric should contain at least one-third by volume of shrinkable component and the remainder can be non-shrinkable. The shrinkable component should have at least 15% reduction in linear direction in the direction of winding when this component is tested separately unrestrained by heating to the temperature and for the time that the capacitor is to be subjected. Those skilled in the art can readily test the various commercially available shrinkable materials, considering the core size, wrap tightness and like characteristics they desire to employ. Prior art capacitors in which shrinkage of dielectrics is employed (but for other purposes) include the U.S. patents to Devaney, No. 3,221,227, to Peck et al., No. 2,735,970, and to Rice et al. No. 3,100,857, to which reference can be made.

In FIGURE 6 are shown several types of barbed terminals that can be used. In 6a the terminal wire is formed into a single barb projecting substantially normal to the wire axis. In 6b the lead wire has been deformed to a double barb. The terminal can have more than two barbs as shown in FIGURE 6c. The barbs can be spaced from the end as in 6d to provide additional rigidity to the finished structure. In 6e a single barb terminal of type 6a has additionally been shaped so that the barb can be accurately positioned by the butting of the bend against the preform when the terminal is inserted. In 6f the terminal with the barb is made separately from the lead wire and might, for example, contain a hole 29 for insertion of a lead wire which could be held in place frictionally, by crimping, by soldering or other methods known in the art. Such lead can be attached to the terminal before or after the terminal is secured in the capacitor preform. In 6g two terminals of the type 6d are shown separated by a dielectric 30. This dielectric could, for example, be a tube of polytetrafluoroethylene or a ceramic spacer. The double terminal of 6g would be inserted from one end through the hollow core of the preform, and positioned prior to shrinkage. Other embodiments will occur to one skilled in the art.

The purpose of the barb is to penetrate the dielectric and the electrode and to this end a sharp point will aid the penetration. The taper to the body will depend upon the material of which the barb is made and the distance of penetration desired. When the barb is constructed from the lead wire, commonly 18 to 20 gauge copper or steel wire, a taper from point to stock of one and a half times the diameter has been found satisfactory. If a separate terminal such as is shown in FIGURE 6f is used, the barbs can be of hardened steel perhaps 10 mils in stock diameter and a taper equal or less than the diameter. The exact shape is not critical and the barb may, for example, have a blade shape.

The invention will be described further in conjunction with the following specific examples.

EXAMPLE 1

A capacitor preform was wound from two aluminum foils, each 0.25 mil thick and 1½ inches wide, and two dielectric films each 0.5 mil thick and two inches wide. The preform was wound on a ⅛ inch diameter removable mandrel. The aluminum foils were offset such that an outer edge of dielectric ⅛ inch wide was left at each end of the preform, and the two electrodes did not overlap for one quarter inch at each end of the preform. Wrapping 43 turns produced a capacitor of about 0.1 microfarad capacitance. The dielectric films were commercially available molecularly oriented polyethylene terephthalate type HS "Mylar" (E. I. du Pont de Nemours & Company). This film shrank 50% in length and 50% in width when heated for 2 minutes at 150° C. in a circulating air oven.

Figure 6F:
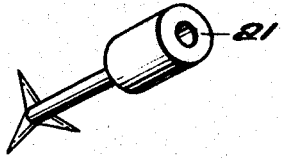
Figure 6G:
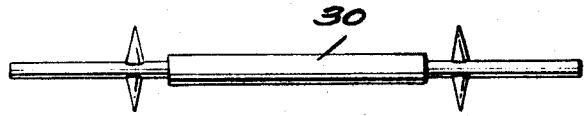

Terminals were made of wire to the shape shown in FIGURE 6a. The wire was number 20 AWG (American Wire Gauge) copper wire. Two-inch lengths of wire were cut from the roll, straightened, the tip sharpened with a rotary grinder, the tip retinned with a solder. At one end of each length, a one-eighth inch section was bent approximately normal to the wire axis to form the barb.

The terminal wires were inserted in the ends of the preform and positioned opposite the center of the foil extensions. The barbs were one-quarter inch in from the ends of the capacitor preform. The assembly was placed in a circulating air oven maintained at 150° C. for 2 minutes. Then the capacitor was removed from the oven. The hollow core had collapsed on the terminals and the barb penetrated into the preform. The terminals were firmly attached to the capacitor.

Five capacitors made in accordance with this example were tested. The pull-out strength at the terminals was measured by grasping the terminals in a tensile testing machine, applying force along the lead wire axis, and recording the maximum force necessary to pull a terminal from the capacitor. The average pull-out strength was 8 pounds. Failure occurred by straightening of the wire rather than failure of the wound film. The capacitance-to-volume ratio of the preform was 0.54 microfarad per cubic inch. After the heat treatment the ratio was increased to 0.73 microfarad per cubic inch.

Other capacitors were wound with the foils in contact and the measured contact resistance at the terminals was 0.06 ohm.

EXAMPLE 2

Four capacitors were prepared in accordance with the procedure of Example 1 except that the terminal wires were made from number 20 AWG steel spring wire. The average pull-out strength was 30 pounds for these terminals.

EXAMPLE 3

Ten capacitors were prepared in accordance with the procedure of Example 1 except that the heat treatment time was 4 hours. The terminals were firmly attached and the direct current breakdown strength was 3700 volts. The wire was number 18 AWG copper. The average pull-out strength was 13.9 pounds.

Accelerated life tests were performed at 125° C. and 600 volts DC on additional capacitors made in accordance with Example 3. Only 5% of the capacitors failed in 270 hours.

EXAMPLE 4

Capacitors were prepared as in Example 3 except that the dielectric film was "Clysar" oriented linear polypropylene film (Du Pont product). This film had a shrinkage of 30% in the wind direction and 8% in the transverse direction when tested at 140° C. After the heat treatment the leads were firmly anchored in place and the average pull-out strength was 13.7 pounds.

From the foregoing discussion, description and data, it is evident that this invention provides capacitors with strongly attached terminals produced in a markedly simple fashion. The process avoids the damage to the dielectric which can occur if the dielectric is heated to or above its melting point in the process of applying terminals. In addition to the stated advantages, there are others as well. In the case of a impregnated capacitor, the terminal of this invention may be attached during or after impregnation. Heat treatment or stabilization is a customary treatment for capacitors. In this invention the additional termination steps are eliminated because the termination occurs during heat treatment.

While the invention has been described with certain detail, it will be evident that changes can be made therefrom without departing from its scope.

What is claimed is:

1. A wound electric capacitor comprising layers of dielectric and spaced electrodes, the electrodes being partly offset from one another, and at least one barbed lead member physically penetrating at least one layer of dielectric and one electrode.

2. The capacitor of claim 1 in which the lead member is a wire having a barded terminal portion normal thereto, and the lead extends from the center of an end of the capacitor.

3. The capacitor of claim 2 in which the dielectric comprises at least 30 percent by volume of shrunk, heat-shrinkable organic dielectric.

4. The capacitor of claim 3 in which the shrunk dielectric is a polyester film.

5. A method of applying a terminal in producing an offset electrode, wound electric capacitor comprising inserting a barbed end of a barbed terminal in a hollow core of a wound capacitor preform comprising offset electrodes spaced by dielectric comprising at least 30 percent by volume of shrinkable dielectric opposite the offset portion of one electrode, and shrinking said dielectric to cause shrinkage and penetration of said barb into said one electrode.

6. A method according to claim 5 in which the shrinkable dielectric is an oriented organic film, and shrinking is accomplished by heating to relax the oriented film.

7. A method according to claim 6 in which the film is oriented polyester film capable of shrinking, from an untensioned state, at least 15 percent in one direction.

8. A method according to claim 6 in which the film is biaxially oriented polyethylene terephthalate.

References Cited

FOREIGN PATENTS 436,642 10/1935 Great Britain.
655,721 1/1963 Canada.

DARRELL L. CLAY, *Primary Examiner.*

E. GOLDBERG, *Assistant Examiner.*